(12) United States Patent
Kimura

(10) Patent No.: US 6,744,975 B1
(45) Date of Patent: Jun. 1, 2004

(54) VIDEO AND AUDIO MULTIPLEX RECORDING APPARATUS

(75) Inventor: Tomohiro Kimura, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/538,472

(22) Filed: Mar. 30, 2000

(30) Foreign Application Priority Data

Mar. 30, 1999 (JP) .......................................... 11-089886

(51) Int. Cl.$^7$ ................................................ H04N 5/781
(52) U.S. Cl. ........................................ 386/98; 386/125
(58) Field of Search ............................... 386/1, 39, 45, 386/96, 98, 125, 126, 95; 360/18, 20; 348/423.1; H04N 5/76, 5/781

(56) References Cited

U.S. PATENT DOCUMENTS 6,580,873 B2 * 6/2003 Ando et al. .................... 386/95

2003/0123855 A1 * 7/2003 Okada et al. .................. 386/98

FOREIGN PATENT DOCUMENTS

EP 0 924 704 A2 6/1999

* cited by examiner

Primary Examiner—Thai Tran
(74) Attorney, Agent, or Firm—Sughrue Mion, PLLC

(57) ABSTRACT

In a video and audio multiplex recording apparatus, an allocation table of a unit video block and a unit audio block is generated in a control section, and a control signal is generated according to the allocation table. Multiplexing data of the data structure in which each unit video block corresponds to each unit audio block in 1 to 1, is outputted from a multiplexer according to the control signal. Accordingly, the correspondence of the audio data to the video data is distinct, and the audio insert can be easily conducted. Further, because the data structure which is not discontinuous at the start portion of the overwrite of the audio data, is formed according to the allocation table, thereby, the audio insert in which noises do not occur at the time of reproducing, can be conducted, and the fine quality audio editing can be conducted.

2 Claims, 8 Drawing Sheets

| | | | | | | | | | TOTAL |
|---|---|---|---|---|---|---|---|---|---|
| VOBU# | 1 | 2 | 3 | 4 | 5 | 6 | 7 | 8 | |
| A_PCK | 6 | 7 | 6 | 7 | 6 | 7 | 7 | 7 | 53 |
| AAU NUMBER | 15 | 16 | 15 | 15 | 16 | 16 | 16 | 16 | 125 |
| VOBU# | 9 | 10 | 11 | 12 | 13 | 14 | 15 | 16 | |
| A_PCK | 6 | 7 | 6 | 7 | 6 | 7 | 7 | 7 | 53 |
| AAU NUMBER | 15 | 16 | 15 | 16 | 15 | 16 | 16 | 16 | 125 |
| VOBU# | 17 | 18 | 19 | 20 | 21 | 22 | 23 | 24 | |
| A_PCK | 6 | 7 | 6 | 7 | 6 | 7 | 7 | 7 | 53 |
| AAU NUMBER | 15 | 16 | 15 | 16 | 15 | 16 | 16 | 16 | 125 |
| VOBU# | 25 | 26 | 27 | 28 | 29 | 30 | 31 | 32 | |
| A_PCK | 6 | 7 | 6 | 7 | 6 | 7 | 7 | 7 | 53 |
| AAU NUMBER | 15 | 16 | 15 | 16 | 15 | 16 | 16 | 16 | 125 |
| VOBU# | 33 | 34 | 35 | 36 | 37 | 38 | 39 | 40 | |
| A_PCK | 6 | 7 | 6 | 7 | 6 | 7 | 7 | 7 | 53 |
| AAU NUMBER | 15 | 16 | 15 | 16 | 15 | 16 | 16 | 16 | 125 |
| VOBU# | 41 | 42 | 43 | 44 | 45 | 46 | 47 | 48 | |
| A_PCK | 6 | 7 | 6 | 7 | 6 | 7 | 7 | 7 | 53 |
| AAU NUMBER | 15 | 16 | 15 | 16 | 15 | 16 | 16 | 16 | 125 |
| VOBU# | 49 | 50 | 51 | 52 | 53 | 54 | 55 | 56 | |
| A_PCK | 6 | 7 | 6 | 7 | 6 | 7 | 7 | 7 | 53 |
| AAU NUMBER | 15 | 16 | 15 | 16 | 15 | 16 | 16 | 16 | 125 |
| VOBU# | 57 | 58 | 59 | 60 | 61 | 62 | 63 | 64 | | |
| A_PCK | 6 | 7 | 6 | 7 | 7 | 7 | 7 | 7 | 54 | 425 |
| AAU NUMBER | 15 | 16 | 15 | 16 | 16 | 16 | 16 | 16 | 126 | 1001 |

VIDEO AND AUDIO MULTIPLEX RECORDING APPARATUS

BACKGROUND OF THE INVENTION

1. Field of the Invention

The present invention relates to a video and audio multiplex recording apparatus in which, particularly, the audio data can be easily re-written, and which is used for, for example, a re-writable digital video disk player (hereinafter, referred to as DVD-RW) in which the video data and the audio data recorded in a recording medium can be re-written.

2. Description of the Related Art

FIG. 2 is a schematic structural view showing an example of the conventional video and audio multiplex recording apparatus.

This video and audio multiplex recording apparatus has an MPEG coding device 1. The MPEG coding device 1 converts an analog video input signal Svi and an analog audio input signal Sai respectively into the digital compression video data and the digital compression audio data and multiplexes them according to, for example, an MPEG2 (Motion Picture Experts Group Phase 2) system, and generates the multiplexing data S1 and outputs it. A personal computer 2 to convert the multiplexing data S1 into the multiplexing data S2 with a predetermined format and output it, is connected to the output side of the MPEG coding device 1. A hard disk driver (hereinafter, referred to as HDD) 3 to record the multiplexing data S2 is connected to the output side of the personal computer 2.

FIG. 3 is a typical view showing an example of the data structure of the multiplexing data S1 in FIG. 2.

Referring to the view, operations of FIG. 2 will be described.

The video input signal Svi and the audio input signal Sai are inputted into the MPEG coding device 1. In the case where the standard of the video input signal Svi is the standard of, for example, the NTSC (National Television System Committee) and a frame frequency is 29.97 Hz, when the video input signal Svi is converted into the digital data, because the signal is coded for each frame unit according to the MPEG2 system, the coded video data has a unit of 33.6 ms (=1/29.97 Hz). In this video data, 1 group (1 Group of Picture, hereinafter referred to as 1GOP) is composed of 3 kinds of images of the I picture (Intra-Picture, Intra-frame coding image), the P picture (Predictive-Picture, Between frame forward predictive coding image) and the B picture (Bidirectionary-Predictive-Picture, Bidirectionary predictive coding image). When the audio input signal Sai is converted into the digital data, 1 audio frame is composed of 1536 samples, and is compressed according to the MPEG2 system or the AC-3 standard. The width of time of 1 audio frame is 32 ms when a sampling frequency is, for example, 48 kHz, and after compression, it is the audio data of the fixed length code which is the AAU (Audio Access Unit). The length is, for example, 768 bytes at 192 kbps.

When these video data and audio data are multiplexed, because the compression of the video data by the MPEG2 system is by the variable-length code, the video data for one frame is dispersed into a plurality of video packs (hereinafter, referred to as V_PCK), and the audio data for one audio frame is dispersed into a plurality of audio packs (hereinafter, referred to as A_PCK). Then, a plurality of V_PCK and a plurality of A_PCK are multiplexed, and a stream of the multiplexing data S1 is generated. A plurality of the AAU are multiplexed in the A_PCK.

In the multiplexing data S1, in one VOBU (Video Object Unit), one A_PCK is allotted to several V_PCKs. Each V_PCK has, for example, a capacity of 2048 bytes, and is composed of a pack header (Pack Header) in which an additional information for time base reference for the synchronous reproducing is stored, a system header (System Header) in which an outline of overall stream of the multiplexing data S1 is stored, a packet header (Packet Header) in which the attribute of the video data is stored, and a video data (Video Data). Each A_PCK has, for example, a capacity of 2048 bytes, and is composed of a pack header (Pack Header) which is the same as the V_PCK, a packet header (Packet Header) in which the attribute of the audio data is stored, and an audio data (Audio Data). The audio data is composed of a plurality of AAUs (Audio Access Unit) as a payload of A_PCK. The multiplexing data S1 is sent from the MPEG coding device 1 to the personal computer 2, and from the personal computer 2, the multiplexing data S2 suitable to the format of the HDD 3 is outputted. The multiplexing data S2 is recorded in the HDD 3 as a file.

However, in the conventional video and audio multiplex recording apparatus in FIG. 2, there are problems as the followings.

In the video and audio multiplex recording apparatus in FIG. 2, the multiplexing data S1 has the data structure as shown in FIG. 3, and because the width of time of one AAU is 32 ms, the width of time (=0.5005 s) of one VOBU is not its integer times. Further, the capacity of A_PCK is 2048 bytes, and its payload is not integer times of AAU (768 bytes/at the time of 192 kbps). Therefore, the audio data (that is AAU) in the A_PCK which is multiplexed in one VOBU, is not only the corresponding audio data of VOBU, accordingly, the correspondence of the audio data to the video data in the file is not definite, and there is a problem that it is difficult to re-record only the audio data later (for example, audio insert). Further, even when another audio data is overwritten onto the audio data at some position by some means, because the data structure at the start point of the overwrite is discontinuous, the decode faulty occurs at the time of reproduction, and there is a case where noises occur. In this case, because it is impossible to eliminate only the noise, it is necessary to eliminate whole reproducing sound, and there is a problem that a high quality audio compilation can not be conducted.

SUMMARY OF THE INVENTION

In order to solve the problems, according to a first aspect of the present invention, there is provided a video and audio multiplex recording apparatus, comprising: video signal compression means for inputting digital video data and forming a unit video block for each of predetermined frame numbers, and by compressing the video data included in each unit video block by a first compression rate and packaging it by a predetermined information amount unit, for generating and outputting compression video data; audio signal compression means for inputting digital audio data and forming a unit audio block for each of predetermined sample numbers, and by compressing the audio data included in each unit audio block by a second compression rate and packaging it by a predetermined information amount unit, for generating and outputting compression audio data; multiplexing means for time-division-multiplexing the compression video data and the compression audio data according to a control signal, and generating and outputting multiplexing data; an encoder for encoding the multiplexing data by a predetermined encoding system, and generating and outputting encode data; recording means for recording the encode data in a recording medium; and control means including memory means for storing an allocation table in which the unit video block and the unit audio block are allocated, according to a least integer ratio which is a ratio of the number of the unit video blocks and the number of the unit audio blocks when a least common multiple of a cycle period of the unit video block and that of the unit audio block is obtained, for generating and outputting the control signal according to the allocation table.

According to a second aspect of the present invention, there is provided a video and audio multiplex recording apparatus, comprising: video signal compression means for inputting digital first video data and forming a unit video block for each of predetermined frame numbers, and by compressing the first video data included in each unit video block by a first compression rate and packaging it by a predetermined information amount unit, for generating and outputting compression video data; audio signal compression means for inputting digital first audio data and forming a unit audio block for each of predetermined sample numbers, and by compressing the first audio data included in each unit audio block by a second compression rate and packaging it by a predetermined information amount unit, for generating and outputting compression audio data; multiplexing means for time-division-multiplexing the compression video data and the compression audio data according to a control signal, and generating and outputting the multiplexing data, or for time-division-multiplexing the compression audio data and supplied second video data according to the control signal, and generating and outputting the multiplexing data; an encoder for encoding the multiplexing data by a predetermined encoding system, and generating and outputting encode data; recording and reproducing means for recording the encode data in a recording medium, and for reproducing the encode data recorded in the recording medium and outputting reproducing data; a decoder for decoding the reproducing data by a decode system corresponding to the predetermined encode system, and generating and outputting decode data; separation means for inputting the decode data and separating it into the second video data and second audio data and outputting them; operation means for outputting a designation signal for designating an audio insert operation to re-write the data corresponding to the compression audio data in the encode data recorded in the recording medium, according to the operation of an operator; and control means including memory means for storing an allocation table in which the unit video block and the unit audio block are allocated, according to a least integer ratio which is a ratio of the number of the unit video blocks and the number of the unit audio blocks when a least common multiple of a cycle period of the unit video block and that of the unit audio block is obtained, for generating and outputting the control signal for time-division-multiplexing the compression audio data and the second video data according to the allocation table, when the audio insert operation is designated according to the designation signal.

DETAILED DESCRIPTION OF THE PREFERRED EMBODIMENT

Figure 1:
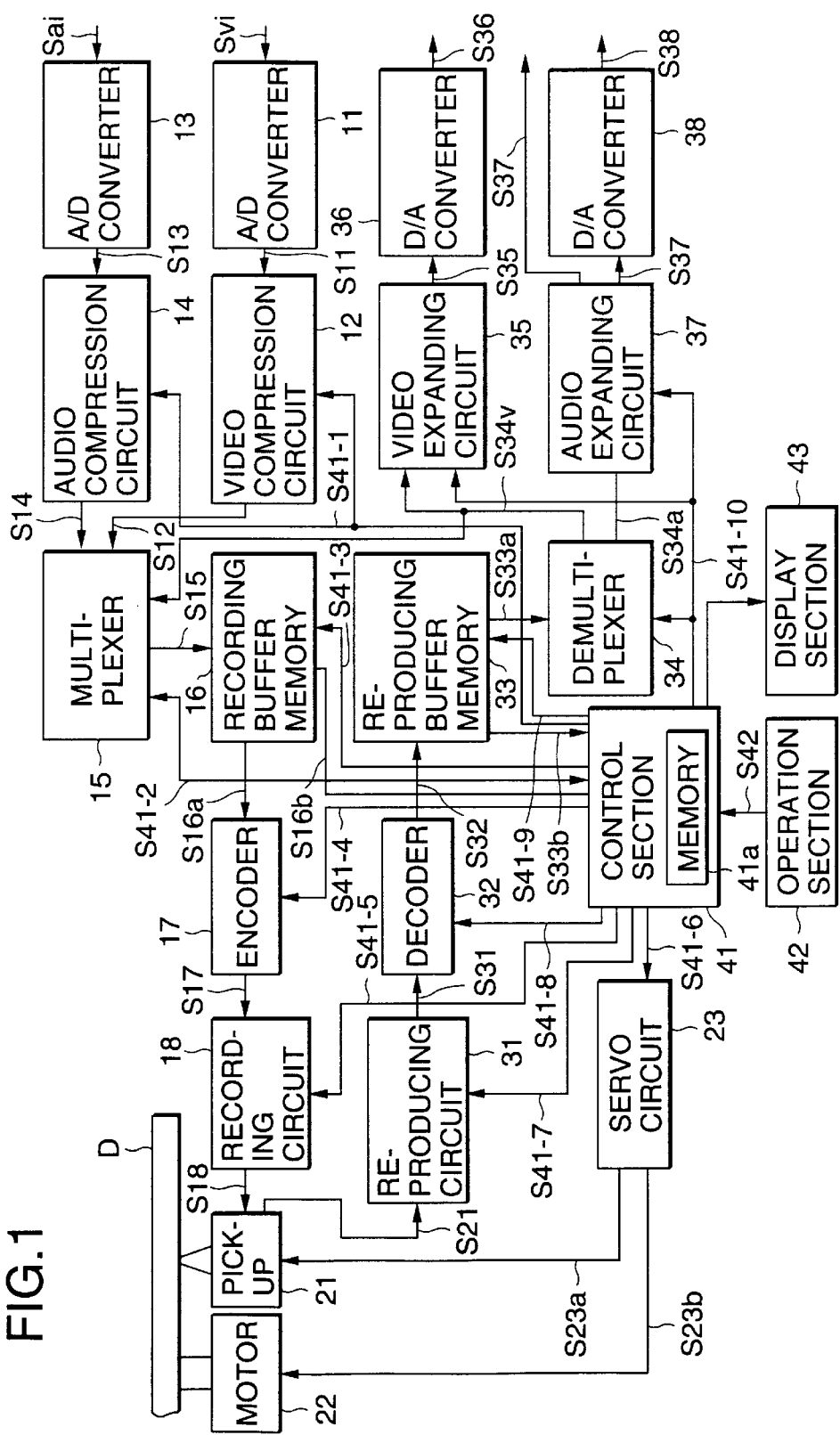
FIG. 1 is a structural diagram of a video and audio multiplex recording apparatus of an embodiment of the present invention.
Figure 2:
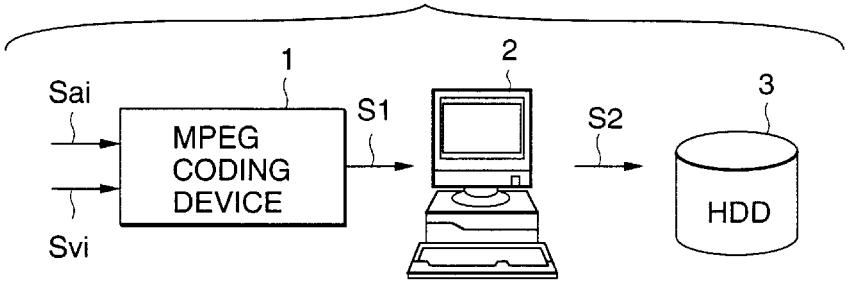
FIG. 2 is a structural view of the conventional video and audio multiplex recording apparatus.
Figure 3:
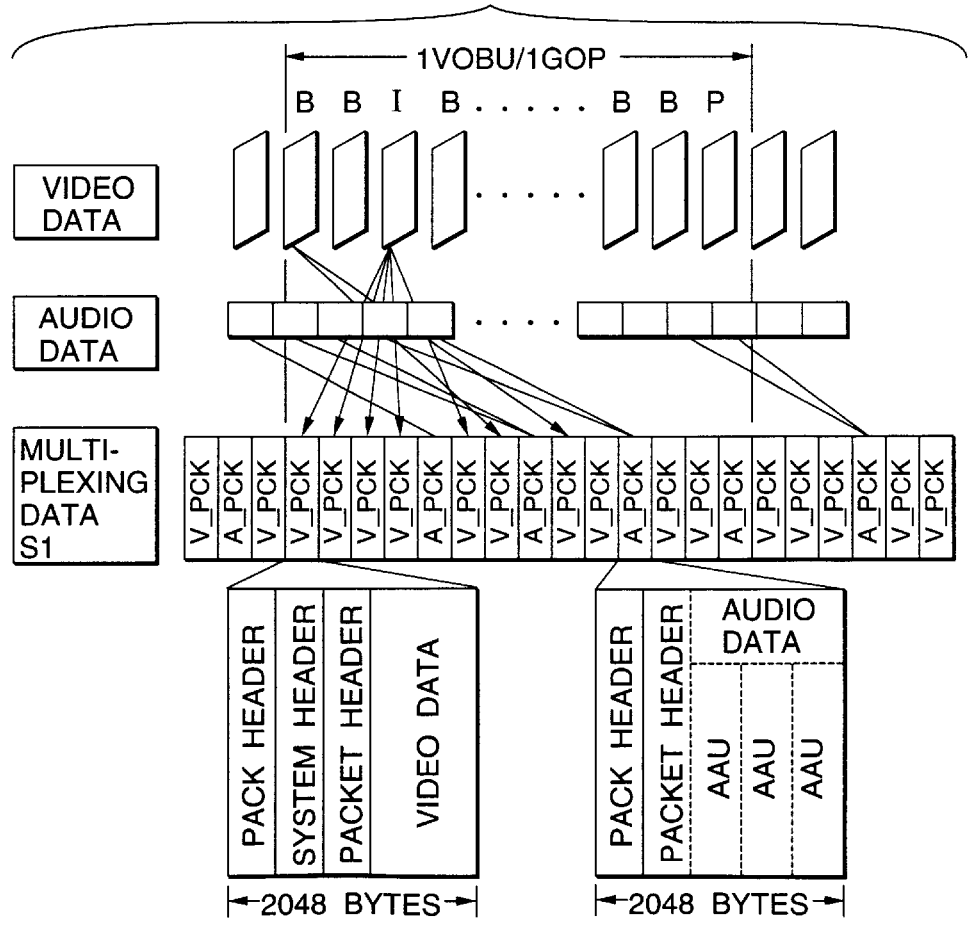
FIG. 3 is a typical view of a data structure of the multiplexing data S1 in FIG. 2.

FIG. 1 is a schematic structural diagram of a video and audio multiplex recording apparatus showing the embodiment of the present invention.

The video and audio multiplex recording apparatus has an A/D converter 11 by which an analog video input signal Svi is analog/digital (hereinafter, referred to as A/D) converted, and a digital video data S11 is generated and outputted. A video signal compression means (for example, video compression circuit) 12 is connected to the output side of the A/D converter 11. The video compression circuit 12 is a circuit by which the video data S11 is inputted and a unit video block (for example, VOBU) is formed for each of a predetermined number of frames, and the video data included in each VOBU is compressed (for example, variable length coding according to the MPEG 2) by the first compression rate, designated according to a control signal S41-1, and by packaging it (for example, V_PCK) in a predetermined unit of amounts of information (for example, 2048 bytes), the compression video data S12 is generated and outputted.

Further, the video and audio multiplex recording apparatus has an A/D converter 13 by which an analog audio input signal Sai is A/D converted and a digital audio data S13 is generated and outputted. An audio signal compression means (for example, audio compression circuit) 14 is connected to the output side of the A/D converter 13. The audio compression circuit 14 is a circuit by which the audio data 13 is inputted, and a unit audio block (for example, AAU) is formed for each of a predetermined number of samples, and the audio data included in each AAU is compressed (for example, fixed length coding according to the AC-3 system) by the second compression rate designated according to the control signal S41-1, and by packaging (for example, A_PCK) in a predetermined unit of information amount, the compression audio data S14 is generated and outputted. A multiplexing means (for example, multiplexer) 15 is connected to each of output sides of the video compression circuit 12 and the audio compression circuit 14. The multiplexer 15 has a function by which the compression video data S12 and the compression audio data S14 are inputted at the timing designated according to a control signal S41-2, and time-division-multiplexed, and the multiplexing data S15 is generated and outputted. Further, the multiplexer 15 also has a function by which the compression audio data S14 and a supplied video data S34v are inputted at the timing designated according to the control signal S41-2, and time-division-multiplexed, and the multiplexing data S15 is generated and outputted. A record buffer memory 16 is connected to the output side of the multiplexer 15.

The record buffer memory 16 has a function by which the multiplexing data S15 is written according to the third control signal S41-3 and a data amount signal S16b showing the accumulated amounts of the multiplexing data S15 is outputted, and together with that, the multiplexing data S15 is read out according to the control signal S41-3 and the multiplexing data S16a is outputted. An encoder 17 by which the multiplexing data 16a is encoded by a predetermined encode system according to a control signal S41-4, and the encode data S17 is generated (for example, the multiplexing data S16a is 8/16 modulated) and outputted, is connected to the output side of the record buffer memory 16. A recording circuit 18 is connected to the output side of the encoder 17. The recording circuit 18 is a circuit in which the encode data S17 is inputted according to a control signal S41-5, and processing such as the power amplification is conducted thereon, and the recording data S18 is generated and outputted. A pick-up 21 is connected to the output side of the recording circuit 18. The pick-up 21 has a function by which the recording data S18 is optically recorded in a recording medium (for example, optical disks such as a DVD) D according to a control signal S23a, and the recorded recording data S18 is read out and the detection signal S21 is outputted. The optical disk D is rotated by a motor 22 controlled according to a control signal S23b. A servo circuit 23 to generate and output the control signals S23a and S23b according to a control signal S41-6, is connected to the pick-up 21 and the motor 22. A reproducing circuit 31 is connected to the output side of the pick-up 21. The reproducing circuit 31 is a circuit by which the detection signal S21 is waveform-shaped according to a control signal S41-7 and the binary reproducing data S31 is outputted. A recording means is structured by these recording circuit 18, pick-up 21, motor 22 and servo circuit 23. Further, a recording and reproducing means is structured by the recording circuit 18, pick-up 21, motor 22, servo circuit 23 and reproducing circuit 31. A decoder 32 is connected to the output side of the reproducing circuit 31.

The decoder 32 has a function by which the reproducing data S31 is decoded (for example, 8/16 demodulation is conducted on the reproducing data S31) by a decode system corresponding to the encode system of the encoder 17 and the decode data S32 is generated and outputted. A reproducing buffer memory 33 is connected to the output side of the decoder 32. The reproducing buffer memory 33 has a function by which the decode data S32 is inputted according to a control signal S41-9 and written in, and a data amount signal S33b showing an accumulated amount of the decode data S32 is outputted. Further, the reproducing buffer memory 33 also has a function by which the decode data S32 is read out according to the control signal S41-9 and the decode data S33a is outputted. A separation means (for example, demultiplexer) 34 is connected to the output side of the reproducing buffer memory 33. The demultiplexer 34 inputs the decode data S33a according to a control signal S41-10 and separates it into the video data S34v and the audio data S34a, and outputs them.

A video expanding circuit 35 and the multiplexer 15 are connected to the first output side of the demultiplexer 34. The video expanding circuit 35 has a video expanding buffer, not shown, to store the video data S34v, and is a circuit in which the video data S34v is expanded by a expanding rate corresponding to the first compression rate, according to the control signal S41-10, and the expanding video data S35 is generated and outputted. A digital/analog (hereinafter, referred to as D/A) converter 36, by which the expanding video data S35 is D/A converted and a video output signal S36 is generated and outputted, is connected to the output side of the video expanding circuit 35. An audio expanding circuit 37 is connected to the second output side of the demultiplexer 34. The audio expanding circuit 37 has an audio expanding buffer, not shown, in which the audio data S34a is stored, and a circuit in which the audio data S34a is expanded by a expanding rate corresponding to the second compression rate, according to the control signal S41-10, and the expanding audio data S37 is generated and outputted. The D/A converter 38, by which the expanding audio data 37 is D/A converted and the audio output signal S38 is generated and outputted, is connected to the output side of the audio expanding circuit 37.

A control means (for example, control section) 41 is connected to these video compression circuit 12, audio compression circuit 14, multiplexer 15, recording buffer memory 16, encoder 17, recording circuit 18, servo circuit 23, reproducing circuit 31, decoder 32, reproducing buffer memory 33, demultiplexer 34, video expanding circuit 35, and audio expanding circuit 37. An operation means (for example, operation section) 42 by which a designation signal 42 for designating operations according to the operation of the operator is outputted, is connected to the control section 41. Further, a display means (for example, display section) 43, by which an operation state of the video and audio multiplex recording apparatus, for example, reproducing state, recording state, and recording/reproducing position (address) on the optical disk are displayed, is connected to the control section 41. The control section 41 is structured by, for example, a central processing unit which is operated according to programs, and a read only memory (ROM) in which the programs are stored, and has a function by which, according to the designation signal S42, control signals S41-1, S41-2, S41-4, S41-5, S41-6, S41-7, S41-8, an are outputted, and according to the data amount signal S16b, the control signal S41-3 is outputted, and according to the data amount signal S33b, the control signal S41-9 is outputted.

Further, the control section 41 has a function which performs: a least integer ratio detection mode to obtain a least integer ratio M which is a ratio of the number of VOBU and the number of AAU when an least common multiple of a cycle period of the VOBU and the cycle period of the AAU is obtained; an allocation table generation mode to generate an allocation table T to allocate the VOBU and the AAU according to the least integer ratio M; and a control signal output mode to generate the control signal S41-2 according to the allocation table T, and output it. The allocation table T is stored in a memory means (for example, memory) 41a in the control section 41.

Figure 4:
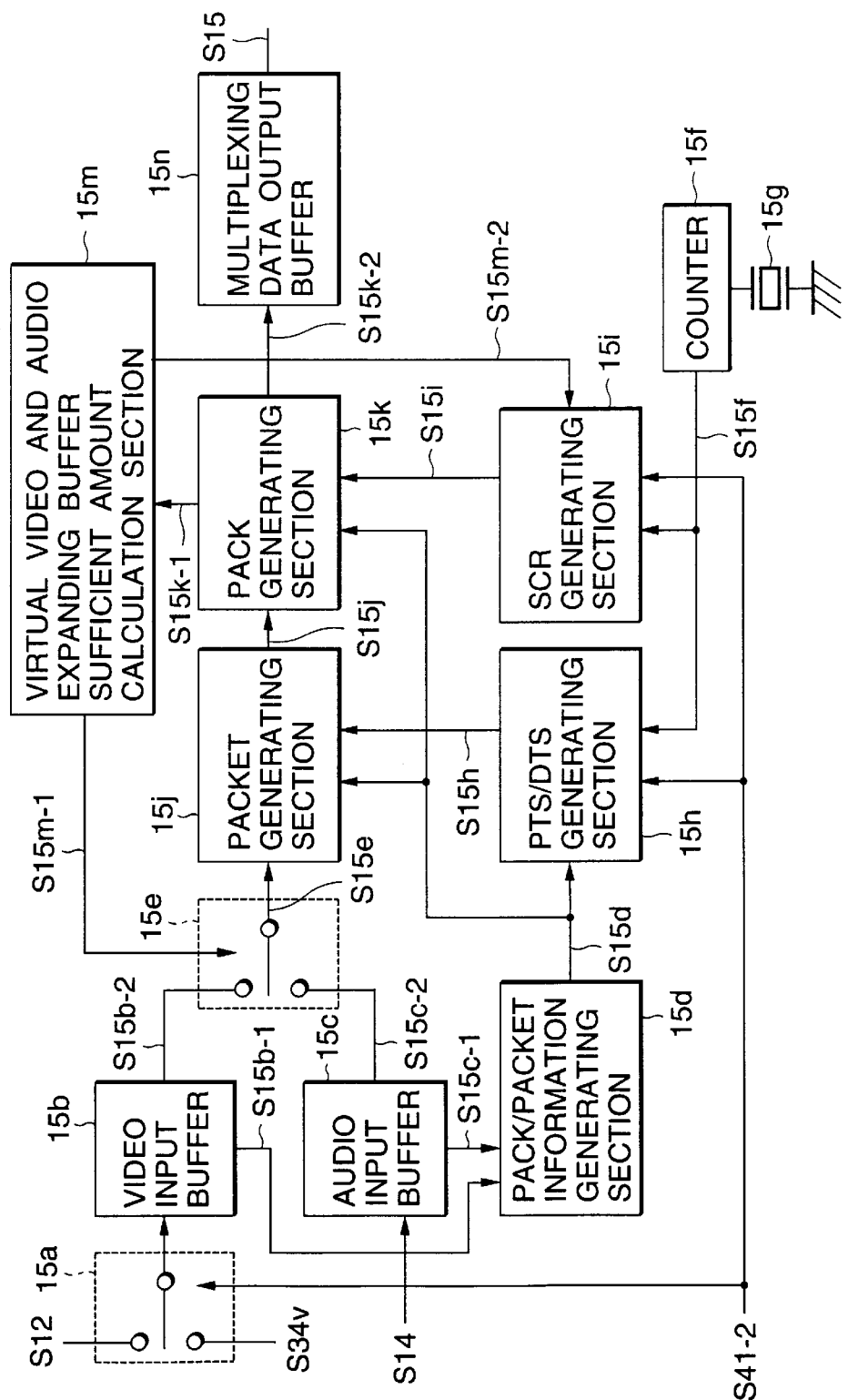
FIG. 4 is a structural diagram of a multiplexer 15 in FIG. 1.

FIG. 4 is a schematic structural diagram showing an example of the multiplexer 15 in FIG. 1. The multiplexer 15 has a switching section 15a which inputs the compression video data S12 or the video data S34v by selecting according to the control signal S41-2. A video input buffer 15b to store the compression video data S12 or the video data S34v outputted from the switching section 15a, is connected to the output side of the switching section 15a. Further, the multiplexer 15 has an audio input buffer 15c to store a compression audio data S14. A pack/packet information generating section 15d is connected to the first output side of the video input buffer 15b and the first output side of the audio input buffer 15c. The pack/packet information generating section 15d inputs a compression video data S15b-1 and a compression audio data S15c-1, and generates the pack/packet information S15d (for example, picture type, temporal reference, amount of codes of the picture of the video compression, audio compression rate, etc.) which is necessary for generation of the pack or packet. A multiplexing section 15e in which the compression video data S15b-2 and the compression audio data S15c-2 are time-division-multiplexed according to a judgement signal S15m-1, and the multiplexing data S15e is generated, is connected to the second output side of the video input buffer 15b and the second output side of the audio input buffer 15c.

Further, a counter 15f is provided in the multiplexer 15. The counter 15f has a function by which an STC (system time clock) S15f of the frequency determined by a crystal oscillator 15g is generated and outputted. A PTS/DTS generation section 15h and an SCR generation section 15i are connected to the output side of the counter 15f. The PTS/DTS generation section 15h, a packet generation section 15j, and a pack generation section 15k are connected to the output side of a pack/packet information generation section 15d. The PTS/DTS generation section 15h inputs the STC S15f, and inputs the pack/packet information S15d according to a control signal S41-2, and generates the PTS (Presentation Time Stamp, time control information of the reproduction output) and the DTS (Decoding Time Stamp, time control information of decoding) (hereinafter, referred to as PTS/DTS) S15h. The packet generation section 15j is connected to the output side of the PTS/DTS generation section 15h. The packet generation section 15j inputs the multiplexing data S15e, and adds the PTS/DTS S15h according to the pack/packet information S15d, and generates the packet S15j.

The SCR generation section 15i inputs an STC S15f according to the control signal S41-2, and generates a SCR (system clock reference) S15i according to a designation signal S15m-2. The pack generation section 15k is connected to the output side of the SCR generation section 15i and the output side of the packet generation section 15j. The pack generation section 15k inputs the packet S15j and the pack/packet information S15d, and adds the SCR S15i, and generates packs S15k-1 and S15k-2. A buffer sufficient amount calculation section for a virtual video and audio expanding 15m and a multiplexing data output buffer 15n are connected to the output side of the pack generation section 15k. The buffer sufficient amount calculation section for a virtual video and audio expanding 15m inputs the pack S15k-1, and outputs a judgement signal S15m-1 and a designation signal S15m-2. Each of the output sides of the buffer sufficient amount calculation section for a virtual video and audio expanding 15m is respectively connected to the multiplexing section 15e and the SCR generation section 15i. The multiplexing data output buffer 15n inputs the pack S15k-2, and outputs the multiplexing data S15.

Figure 5:
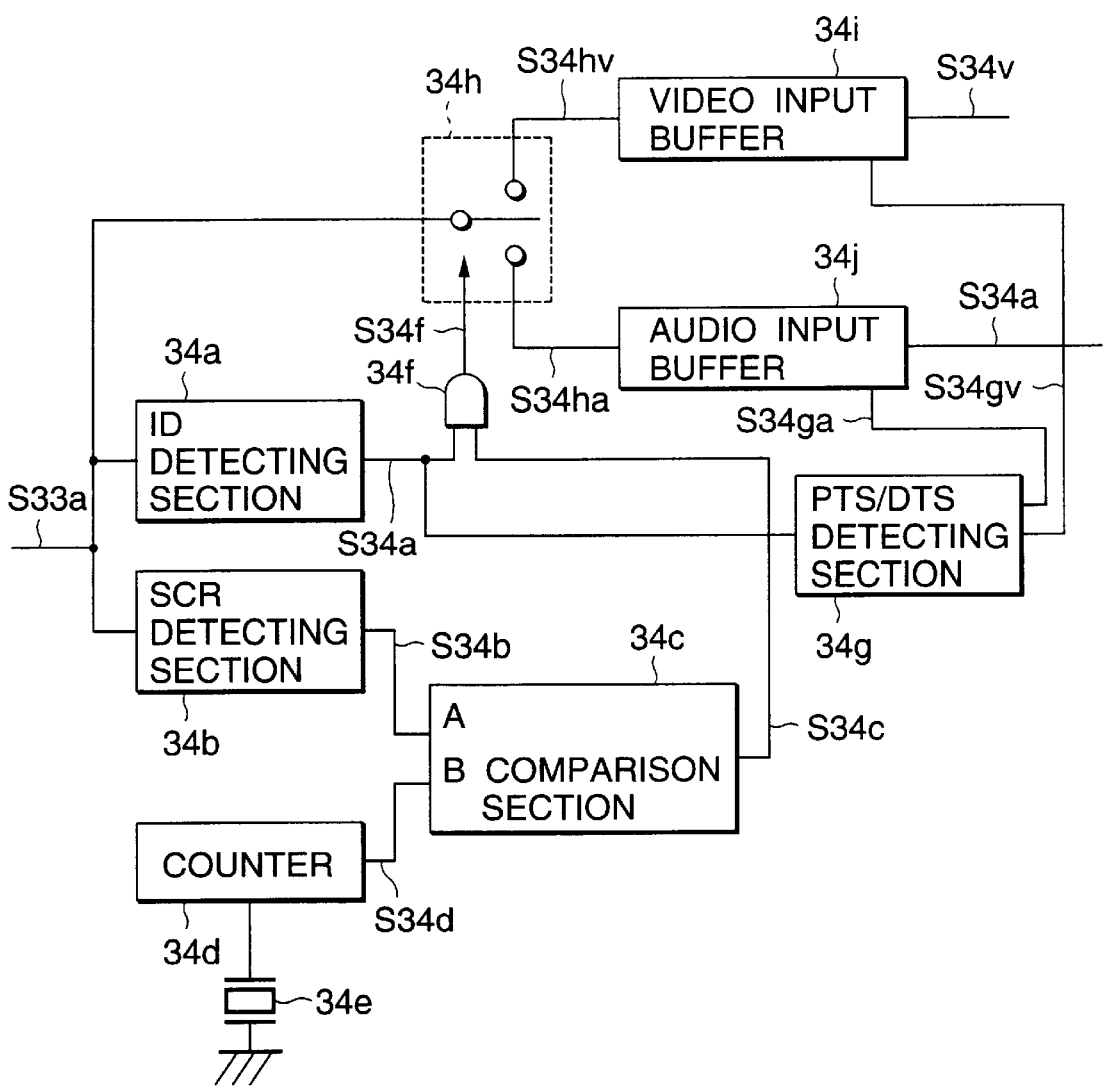
FIG. 5 is a structural diagram of a demultiplexer 34 in FIG. 1.

FIG. 5 is a schematic structural diagram showing an example of demultiplexer 34 in FIG. 1. The demultiplexer 34 has an ID detecting section 34a, and an SCR detecting section 34b. The ID detecting section 34a has a function in which the decode data S33a is inputted and an attribute (ID) of the decode data S33a is detected, and a detection signal S34a is outputted, and the SCR detecting section 34b has a function in which the decode data S33a is inputted and the SCR is detected, and the detection signal S34b is outputted. An input terminal A of a comparison section 34c is connected to the output side of the SCR detecting section 34b, and a counter 34d is connected to an input terminal B of a comparison section 34c. The counter 34d has a function by which an STC S34d of a frequency determined by a crystal oscillator 34e is generated and outputted. The comparison section 34c compares the detection signal S34b with the STC S34d, and generates a comparison result S34c and outputs it. The first input terminal of an AND circuit 34f of two-inputs is connected to the output side of the ID detecting section 34a, and the second input terminal of the AND circuit 34f is connected to the output side of the comparison section 34c. A separating section 34h which separates the decode data S33a into the video data S34hv and the audio data S34ha according to the output signal S34f of the AND circuit 34f, and outputs them, is connected to the output side of the AND circuit 34f.

Further, a PTS/DTS detecting section 34g is connected to the output side of the ID detecting section 34a. The PTS/DTS detecting section 34g detects the PTS and DTS of the detecting signal S34a, and generates enabling signals S34gv and S34ga, and outputs them. A video input buffer 34i and an audio input buffer 34j are connected to each output side of the separating section 34h. The video input buffer 34i inputs the video data S34hv and stores it, and outputs the video data S34v according to the enabling signal S34gv. The audio input buffer 34j inputs the audio data S34ha and stores it, and outputs the audio data S34a according to the enabling signal S34ga.

Figures 6, 7:
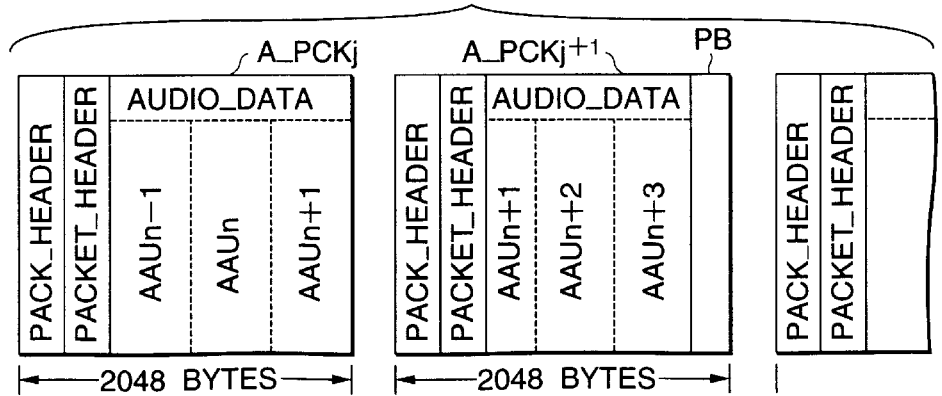
FIG. 6 is a view showing an allocation table T in FIG. 1.
FIG. 7 is a view showing a data structure of an A_PCK in FIG. 5.
Figure 8:
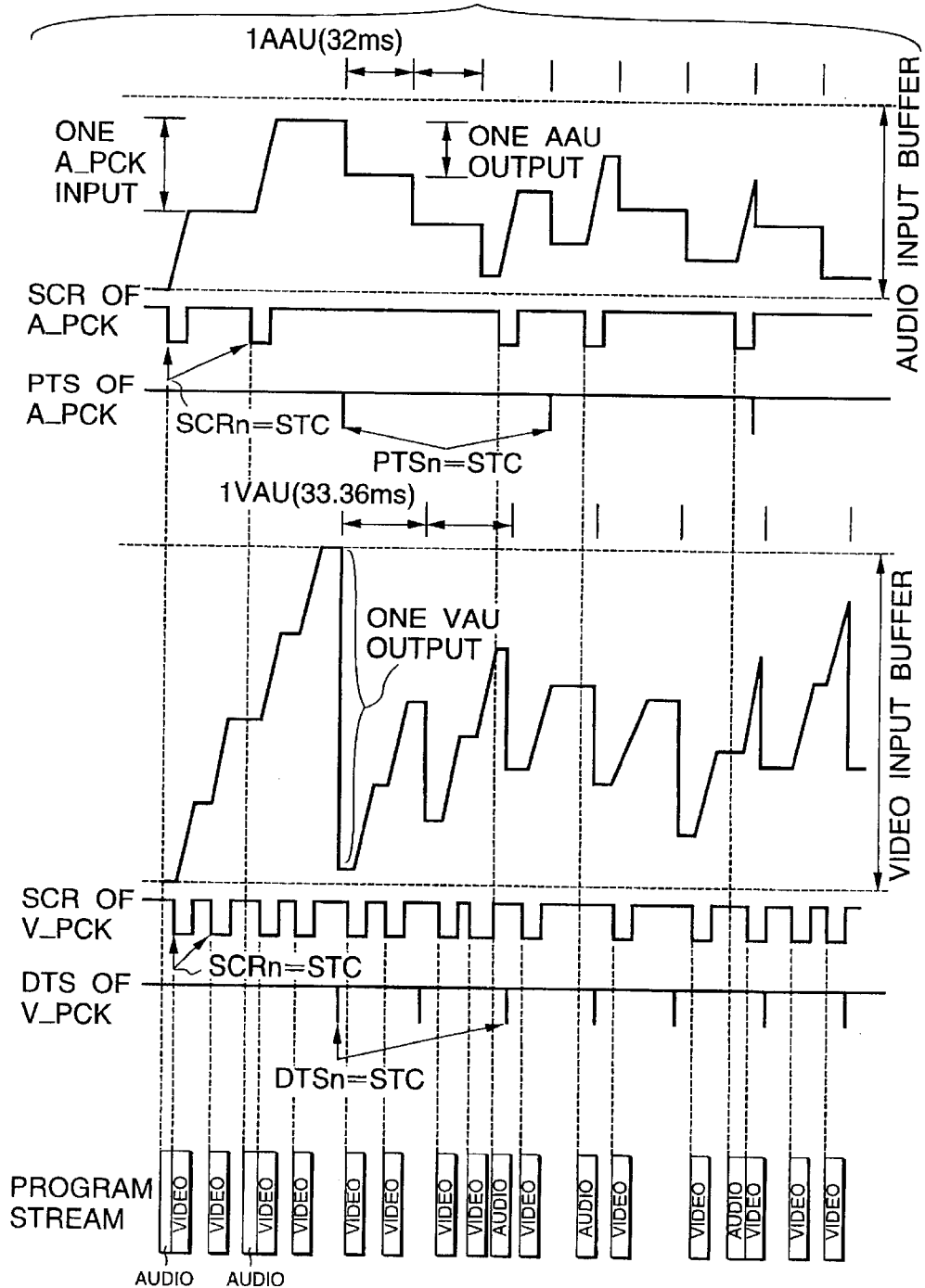
FIG. 8 is a timing chart of FIG. 1.
Figure 9:
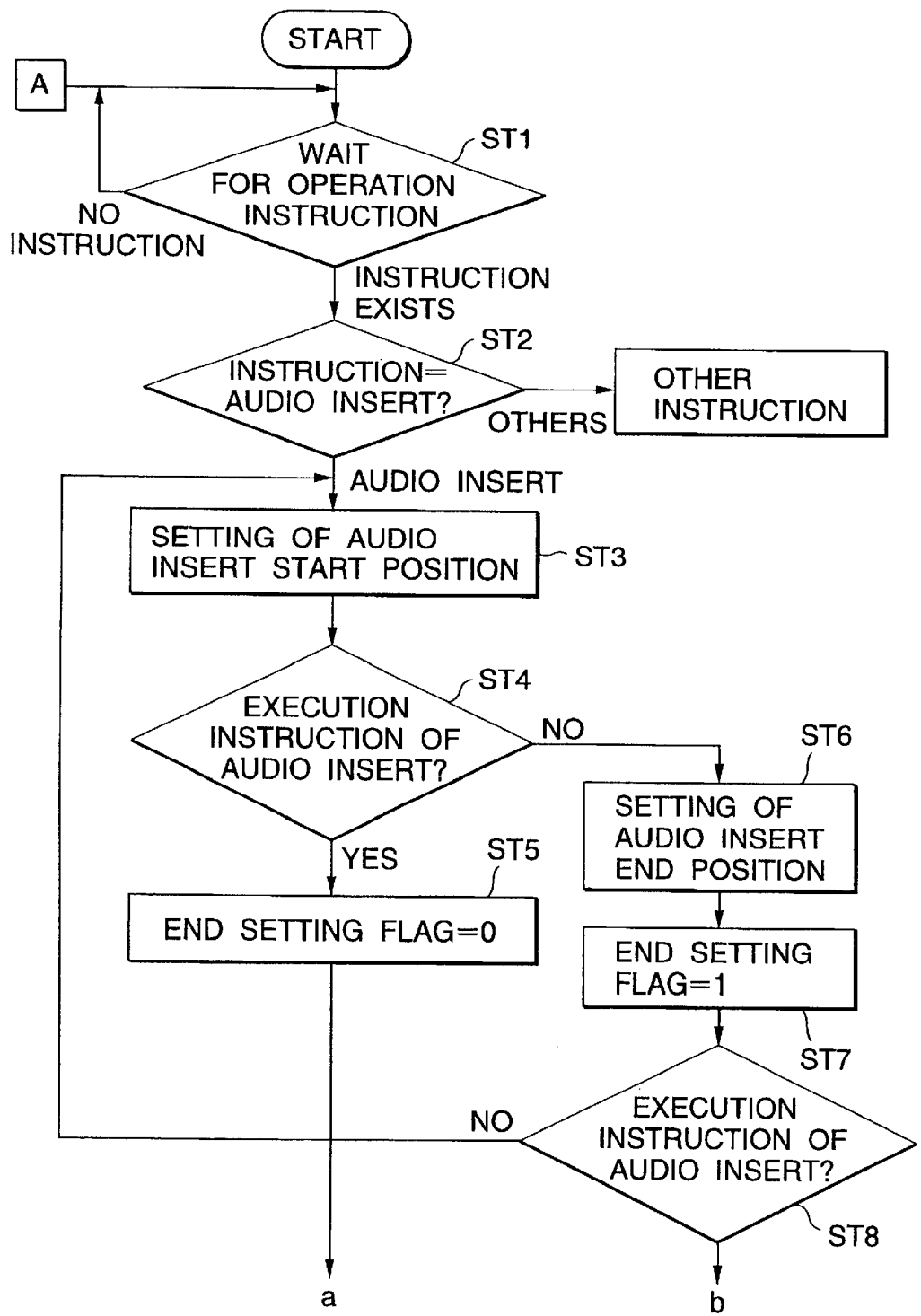
FIG. 9 is a flow chart of FIG. 1.
Figure 10:
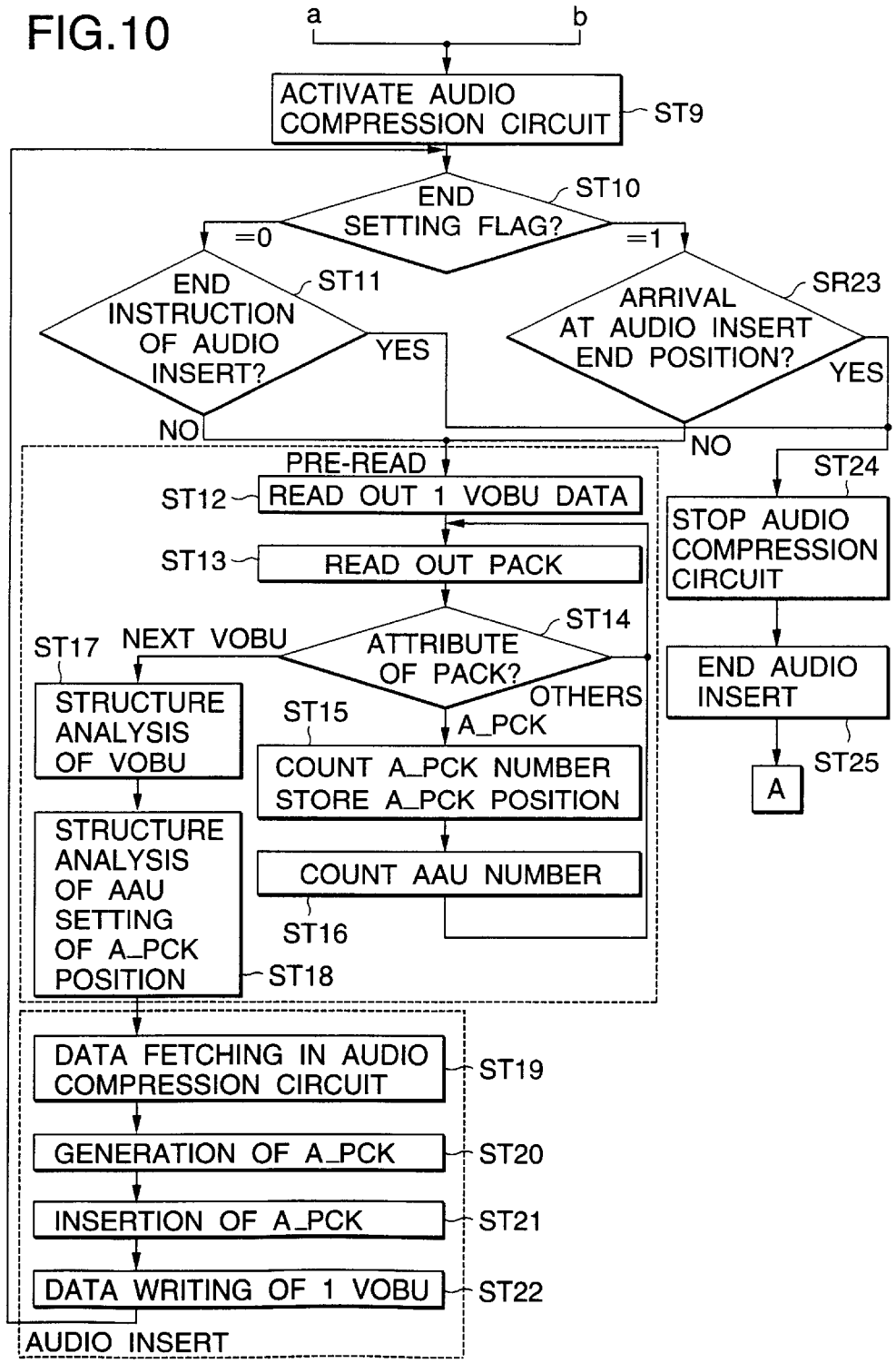
FIG. 10 is a flow chart of FIG. 1.

FIG. 6 is a view showing an example of the allocation table T generated in the video and audio multiplex recording apparatus in FIG. 1, FIG. 7 is a view showing the data structure of the A_PCK in FIG. 6, and FIG. 8 is a timing chart for explaining the operation of the multiplexer 15 in FIG. 4. FIG. 9 and FIG. 10 are flow charts for explaining the audio insert operations in the video and audio multiplex recording apparatus in FIG. 1.

Referring to these FIG. 6, FIG. 7, FIG. 8, FIG. 9 and FIG. 10, the operations (1) to (3) of the video and audio multiplex recording apparatus in FIG. 1, will be described below.

(1) Recording Operation

The video input signal Svi is inputted into the A/D converter 11 and A/D converted, and a video data S11 is outputted from the A/D converter 11. The video data S11 is inputted into the video compression circuit 12, and the VOBU is formed for each of a predetermined number of frames (for example, 15 frames) in the video compression circuit 12, the video data included in each VOBU is variable length coded according to the control signal S41-1, and formed into the V_PCK in a unit of 2048 bytes, and the compression video data S12 is outputted from the video compression circuit 12. The audio input signal Sai is inputted into the A/D converter 13 and A/D converted, and the audio data S13 is outputted from the A/D converter 13. The audio data S13 is inputted into the audio compression circuit 14, and a unit audio block (for example, AAU) is formed for each of a predetermined number of samples (the sampling frequency is, for example, 48 kHz) in the audio compression circuit 14, the audio data included in each AAU is fixed length coded according to the control signal S41-1, and is formed into the A_PCK in a unit of 2048 bytes, and the compression audio data S14 is outputted from the audio compression circuit 14. The compression video data S12 and the compression audio data S14 are inputted into the multiplexer 15, and time-division-multiplexed according to the control signal S41-2, and the multiplexing data S15 is outputted from the multiplexer 15. In this case, in the control section 41, operations of the following modes of (a) to (c) are conducted, and the control signal S41-2 is outputted.

(a) The Least Integer Ratio Detection Mode

In the control section 41, the least integer ratio M which is a ratio of the number of VOBUs and the number of AAUs when the least common multiple of the cycle period of the VOBU and the cycle period of the AAU is obtained according to the designation signal S42, is found.

(b) The Allocation Table Generation Mode

In the control section 41, the allocation table T in FIG. 6 to allocate the VOBU and AAU according to the least integer ratio M is generated. In the allocation table T, in the condition that, in NTSC standard, the frame frequency is 29.97 Hz, and 15 frames for 1 VOBU, and the sampling frequency is 48 kHz for the audio input signal Sai (for example, 192 kbps at AC-3 standard), an example that the video input signal Svi is coded-multiplexed, is shown. Initially, the average number of AAU for 1 VOBU is 1/29.97 (Hz)×15/32 (ms)=15.640625, and in 64 VOBU (=32.032 s), 15.640625×64=1001 AAU (=32.032 s). The allocation table T is generated according to the least integer ratio M (=64/1001), and 1001 AAUs are allocated in 64 VOBUs in an integer. In this case, because a sound is fixed length code, it is preferable that the AAU is distributed as equally as possible.

The data structure of the A_PCK in FIG. 6 is structured by, as shown in FIG. 7, a pack header in which additional information for time base reference for synchronous reproducing is stored, a packet header in which the attribute of the audio data is stored, and a payload in which the AAU is stored. In the case of AC-3 standard, a sub stream id and the audio frame information are written in the payload, and the true audio data per A_PCK is, in the maximum, 2048 bytes—Pack header—Packet header—sub stream id—Audio frame information=2048 bytes—14 bytes—14 bytes—1 byte—3 bytes=2016 bytes. Accordingly, when 15 or 16 AAUs per 1 VOBU are packed, the number of A_PCKs necessary at a minimum is:

$$15 \times 768/2016 = 5.714285... \ 6 \ A\_PCKs$$

$$16 \times 768/2016 = 6.095238... \ 7 \ A\_PCKs.$$

Accordingly, 15 AAUs are allocated for 6 A_PCKs, and 16 AAUs are allocated for 7 A_PCKs, and the allocation table T in FIG. 6 is generated. Further, as shown in FIG. 7, for a fraction in the A_PCK j+1, a padding byte PB or a stuffing byte, not shown, is inserted. Further, in one A_PCK, because the number of AAUs which can be stored therein, is not smaller than 2 and not larger than 3, an AAU n+1 is stored in the condition of overlapping between a A_PCK j and a A_PCK j+1 in FIG. 7.

(c) Control Signal Output Mode

In the control section 41, according to the designation signal S42, the control signal S41-2 is generated according to the allocation table T and outputted. At this time, in the multiplexer 15, the compression audio data S14 is inputted, and as shown in FIG. 8, when the SCR of the A_PCK of the compression audio data S14 coincides with the STC, one of the A_PCK is stored in the audio input buffer 15c. When the PTS of the A_PCK coincides with the STC, the AAU is outputted from the audio input buffer 15c one by one. Further, in the multiplexer 15, the compression video data S12 is inputted, and when the SCR of the V_PCK of the compression video data S12 coincides with the STC, one of the V_PCK is stored in the video input buffer 15b. When the DTS of the V_PCK coincides with the STC, the VAU is outputted from the video input buffer 15b. Then, the V_PCK and the A_PCK are multiplexed, and the multiplexing data S15 having the data structure in which each VOBU corresponds to each AAU in 1 to 1, is generated.

The multiplexing data S15 is written into the record buffer memory 16 according to the control signal S41-3, and from the record buffer memory 16, the multiplexing data 16a and the data amount signal S16b showing the accumulated amount of the multiplexing data S15 are outputted. The data amount signal S16b is inputted into the control section 41 and analyzed, and the control signal S41-3 is outputted from the control section 41. In this case, the record buffer memory 16 is controlled to temporarily store the multiplexing data S15 so that the operation of multiplexing in the multiplexer 15 and the recording operation after that, are not failed. The multiplexing data S16 is inputted into the encoder 17 and coded according to the control signal S41-4, and the encode data S17 is outputted from the encoder 17. The encode data 17 is inputted into the recording circuit 18 and power amplification-processed, and the recording data S18 is outputted from the recording circuit 18. The recording data S18 is inputted into the pick-up 21, and by the pick-up 21, recorded into the optical disk D according to the control signal S23a. At this time, according to the control signal S41-6, the control signals S23a and S23b are outputted from the servo circuit 23, and the pick-up 21 and the motor 22 are respectively controlled according to the control signals 23a and 23b.

(2) Reproducing Operation

The detection signal S21 is outputted from the pick-up 21 according to the control signal S23a. The detection signal S21 is inputted into the reproducing circuit 31 and waveform-shaped according to a control signal S41-7, and the reproducing data S31 is outputted from the reproducing circuit 31. The reproducing data S31 is inputted into the decoder 32, and decoded according to a control signal S41-8, and the decode data S32 is outputted from the decoder 32. The decode data S32 is written into the reproducing buffer memory 33 according to a control signal S41-9, and the decode data S33a and a data amount signal S33b showing the accumulated amount of the decode data S32 are outputted from the reproducing buffer memory 33. The data amount signal S33b is inputted into the control section 41 and analyzed, and a control signal S41-9 is outputted from the control section 41. In this case, the reproducing buffer memory 33 is controlled, in the same manner as the recording buffer memory 16, to temporarily store the decode data S32 so that the reading out operation and the operation in the demultiplexer 34 after that are not failed.

The decode data S33a is inputted into the demultiplexer 34, and separated into the video data S34v and audio data S34a according to the control signal S41-10 and outputted. In this case, in the demultiplexer 34, the decode data S33a is inputted into the ID detecting section 34a and the SCR detecting section 34b, and in the ID detecting section 34a, the A_PCK and the V_PCK are detected and the detecting signal S34a is outputted, and in the SCR detecting section 34b, the SCR is detected and the detecting signal 34b is outputted. The detecting signal S34b is compared with the STC S34d in the comparison section 34c, and a comparison result S34c is outputted from the comparison section 34c. The decode data S33a is separated into the video data S34hv and the audio data S34ha according to an output signal S34f in the separating section 34h. Further, the detcting signal S34a is inputted into the PTS/DTS detecting section 34g, and the PTS and DTS are detected, and the enabling signals S34gv and S34ga are outputted from the PTS/DTS detecting section 34g. The video data S34hv is inputted into a video input buffer 34i, and when the enabling signal S34gv is an active mode, the video data S34v is outputted from the video input buffer 34i. The audio data S34ha is inputted into an audio input buffer 34j, and when the enabling signal S34ga is an active mode, the audio data S34a is outputted from the audio input buffer 34j.

The video data S34v is inputted into a video expanding circuit 35, and expanded by the expanding rate corresponding to the first compression rate according to the control signal S41-10, and the expanding video data S35 is outputted from the video expanding circuit 35. The expanding video data S35 is inputted into the D/A converter 36 and D/A converted, and the video output signal S36 is outputted from the D/A converter 36. The audio data S34a is inputted into the audio expanding circuit 37, and expanded by the expanding rate corresponding to the second compression rate according to the control signal S41-10, the expanding audio data S37 is outputted from the audio expanding circuit 37. The expanding audio data S37 is inputted into the D/A converter 38 and D/A converted, and the audio output signal S38 is outputted from the D/A converter 38.

(3) Audio Insert Operation

When the data structure shown in FIG. 6 is realized, as shown in FIG. 9 and FIG. 10, the audio insert operation is conducted in the control section 41 in the following sequence.

When the operation instruction is inputted, from the operation instruction waiting state (step ST1), it is judged whether this operation instruction is an audio insert (step ST2) When the operation instruction is not the audio insert, processing corresponding to the other instruction is conducted. When the operation instruction is the audio insert, the start position of the audio insert is set (step ST3). In this case, because the compression audio data S14 is aligned in the VOBU unit, the start point of the audio insert is set according to the accuracy of the VOBU. That is, because the VOBU corresponds to the AAU in 1 to 1, when the position of the VOBU at which the audio insert is started, is designated, that position is the top of the corresponding AAU.

It is judged whether an execute instruction of the audio insert is inputted (step ST4), and when the audio insert execute instruction is inputted, the end setting flag is 0 (step ST5), the sequence advances to step ST9. In step ST4, when the audio insert execute instruction is not inputted, the audio insert end position is set (step ST6), and the end setting flag is 1 (step ST7). It is judged whether the execute instruction of the audio insert is inputted (step ST8), and when the execute instruction of the audio insert is not inputted, the sequence returns to step ST3. When the execute instruction of the audio insert is inputted, the sequnce advances to step ST9, and the audio compression circuit 14 is activated.

It is judged whether the end setting flag is 0 or 1 (step ST10), and when the end setting flag is 0, it is judged whether the end instruction of the audio insert is inputted (step ST11). When the end instruction of the audio insert is not inputted, the VOBU is pre-reading analyzed, and the VOBU which is an object to be re-written, is searched, and 1 VOBU data is readout (step ST12) At this time, the data structure of the VOBU is reproduced, and the number of the A_PCK and the number of the AAU in the VOBU, and the position at which the A_PCK in the VOBU is multiplexed, are judged. Then, the pack is read out (step ST13), and it is judged whether an attribute of the read-out pack is the A_PCK or the next VOBU, or the other one (step ST14). When the read-out pack is the A_PCK, the number of the A_PCKs is counted, and the position of the A_PCK is stored (step ST15). The number of the AAU in the A_PCK is counted (step ST16), and the sequence returns to step ST13. In step ST14, also when the attribute of the pack is the other one, the sequence returns to step ST13.

In step ST14, when the attribute of the pack is the next VOBU, the structure of the VOBU is analyzed (step ST17), and the structure of the AAU is analyzed and the position of the A_PCK is set (step ST18). The audio data S13 is fetched in the audio compression circuit 14 (step ST19), and the A_PCK is generated (step ST20). The A_PCK is inserted (step ST21), and the compression audio data S14 and the video data S34v are inputted into the multiplexer 15 at timing designated according to the control signal S41-2, and time-division-multiplexed, and the multiplexing data of the data structure which is not discontinuous in the overwrite start portion of the audio data is outputted. The data of 1 VOBU of the multiplexing data S15 is written in the optical disk D (step ST22), and the audio insert is conducted and the sequence returns to step ST10. In step ST10, when the end setting flag is 1, it is judged whether the sequence reaches the end position of the audio insert in step ST23. When the sequence reaches the end position of the audio insert, the audio compression circuit 14 is stopped (step ST24) and the audio insert is completed (step ST25). In step ST23, the sequence does not reach the end position of the audio insert, the sequence advances to step ST12. In step ST11, when the end instruction of the audio insert is inputted, the sequence advances to step ST24.

As described above, in the present embodiment, in the control section 41, the allocation table T is generated, and according to the allocation table T, the control signal S41-2 is generated, and in the multiplexer 15, the multiplexing data S15 of the data structure in which each VOBU corresponds to the each AAU in 1 to 1, is generated and outputted according to the control signal S41-2, therefore, the correspondence of the audio data to the video data is distinct, thereby, the audio insert can be easily conducted. Further, in the multiplexer 15, the data structure which is not discontinuous at the overwrite start portion of the audio data is formed according to the control signal S41-2, thereby, the audio insert by which noises do not occur at the time of reproducing, can be conducted, and the fine quality audio editing can be conducted.

Incidentally, the present invention is not limited to the above embodiments, but various modifications are possible. As an example of the modifications, the following will be described.

(a) The present invention can also be applied to, for example, HDD, other than DVD-RW.

(b) The sampling frequency for the audio input signal Sai may be 96 kHZ other than 48 kHz.

(c) The number of frames per 1 VOBU is not limited to 15 frames, but the other value may be allowable.

(d) The video input signal Svi is not limited to the NTSC standard, but the other standard such as the PAL standard, may be acceptable.

(e) In FIG. 1, for example, in the case where the A/D converter to A/D convert the video input signal Svi and the audio input signal Sai, is provided in the outside, when the video data S11 and the audio data S13 are supplied from the outside, the A/D converters 11 and 13 may be omitted. Further, when the D/A converter to D/A convert the expanding video data S35 and the expanding audio data S37, is provided in the outside, or when the device to process the expanding video data S35 and the expanding audio data S37 in the digital as it is, is connected, the D/A converters 36 and 38 may be omitted.

(f) The allocation table T may be made in another apparatus before the recording operation or the audio insert operation is conducted, and may be stored in the memory 41a.

As detailed in above, according to the first aspect of the invention, because an allocation table is stored in a memory means, a control signal is generated in a control means according to the allocation table, and in a multiplexing means, the multiplexing data of the data structure in which each unit video block corresponds to each unit audio block in 1 to 1, is generated and outputted according to the control signal, thereby, the correspondence of the audio data and the video data can be distinct.

According to the second aspect of the invention, because in a multiplexing means, the data structure which is not discontinuous at the overwrite start portion of the audio data, is formed according to the control signal, thereby, the audio insert in which noises co not occur at the time of reproducing, can be conducted and the fine quality audio editing can be conducted.

What is claimed is:

1. A video and audio multiplex recording apparatus, comprising:

video signal compression means for inputting digital video data and forming a unit video block for each of predetermined frame numbers, and by compressing the video data included in each unit video block by a first compression rate and packaging it by a predetermined information amount unit, for generating and outputting compression video data;

audio signal compression means for inputting digital audio data and forming a unit audio block for each of predetermined sample numbers, and by compressing the audio data included in each unit audio block by a second compression rate and packaging it by a predetermined information amount unit, for generating and outputting compression audio data;

multiplexing means for time-division-multiplexing the compression video data and the compression audio data according to a control signal, and generating and outputting multiplexing data;

an encoder for encoding the multiplexing data by a predetermined encoding system, and generating and outputting encode data;

recording means for recording the encode data in a recording medium; and control means including memory means for storing an allocation table in which the unit video block and the unit audio block are allocated, according to a least integer ratio which is a ratio of the number of the unit video blocks and the number of the unit audio blocks when a least common multiple of a cycle period of the unit video block and that of the unit audio block is obtained, for generating and outputting the control signal according to the allocation table.

2. A video and audio multiplex recording apparatus, comprising:

video signal compression means for inputting digital first video data and forming a unit video block for each of predetermined frame numbers, and by compressing the first video data included in each unit video block by a first compression rate and packaging it by a predetermined information amount unit, for generating and outputting compression video data;

audio signal compression means for inputting digital first audio data and forming a unit audio block for each of predetermined sample numbers, and by compressing the first audio data included in each unit audio block by a second compression rate and packaging it by a predetermined information amount unit, for generating and outputting compression audio data;

multiplexing means for time-division-multiplexing the compression video data and the compression audio data according to a control signal, and generating and outputting the multiplexing data, or for time-division-multiplexing the compression audio data and supplied second video data according to the control signal, and generating and outputting the multiplexing data;

an encoder for encoding the multiplexing data by a predetermined encoding system, and generating and outputting encode data;

recording and reproducing means for recording the encode data in a recording medium, and for reproducing the encode data recorded in the recording medium and outputting reproducing data;

a decoder for decoding the reproducing data by a decode system corresponding to the predetermined encode system, and generating and outputting decode data;

separation means for inputting the decode data and separating it into the second video data and second audio data and outputting them;

operation means for outputting a designation signal for designating an audio insert operation to re-write the data corresponding to the compression audio data in the encode data recorded in the recording medium, according to the operation of an operator; and control means including memory means for storing an allocation table in which the unit video block and the unit audio block are allocated, according to a least integer ratio which is a ratio of the number of the unit video blocks and the number of the unit audio blocks when a least common multiple of a cycle period of the unit video block and that of the unit audio block is obtained, for generating and outputting the control signal for time-division-multiplexing the compression audio data and the second video data according to the allocation table, when the audio insert operation is designated according to the designation signal.

* * * * *